E. C. VILLIERS.
LEAK STOPPER.
APPLICATION FILED NOV. 1, 1913.

1,122,047.

Patented Dec. 22, 1914.

Witnesses
J. P. Black
H. Foster

Inventor
E. C. Villiers
By: Arthur H. Crawley
Attorney

UNITED STATES PATENT OFFICE.

EDWARD CECIL VILLIERS, OF FAVERSHAM, ENGLAND.

LEAK-STOPPER.

1,122,047. Specification of Letters Patent. Patented Dec. 22, 1914.

Application filed November 1, 1913. Serial No. 798,721.

*To all whom it may concern:*

Be it known that I, EDWARD CECIL VILLIERS, a subject of the King of Great Britain and Ireland, and a resident of Faversham, in the county of Kent, England, (whose post-office address is The Oaks, Ospringe, Faversham, in the county of Kent, England,) have invented Improvements Relating to Leak-Stoppers, of which the following is a specification.

This invention relates to leak stoppers, including collision mats and the like, the object being to make them highly efficient in sealing an aperture, in resisting pressure from without or within, in resisting the wash or current of the water tending to displace them when used upon ships or other water craft, and to afford an easy means of expelling water by pumps or fluid pressure from a flooded vessel or compartment.

Leak stoppers which have been previously designed have not been suitable for such large apertures as are often caused by collision, being deficient in adhesive power over a large area and not being conformable to the uncertain irregularity of surface due to deformation of the ship's plates or even to the ordinary curvature of the hull.

For carrying out the objects of this invention, electromagnets are attached to the leak stopper in any desired number and in a manner suitable for establishing an efficient magnetic connection to the plates of the vessel, which will—for illustration—be assumed to be a ship.

The leak stopper may be made of strong canvas, of any number of thicknesses and suitably waterproofed if necessary, or of any other material or metal according to circumstances. It may be circular, oval, rectangular or of any other desirable shape. The canvas or the like may be supplemented by strong metal plates or ribs, arranged in parallel rows, allowing the stopper to curve or bend one way according to the curvature of a vessel's plate. Tubes may be let into the leak stopper for the purpose of expelling water from a flooded vessel by pumps, steam, or compressed air or equivalent means after the stopper has been placed over an aperture in such vessel. The electric winding passes around near to the edge of the leak stopper, and is surmounted by magnets of the horseshoe kind arranged saddlewise, in sufficient number to complete a circle or a boundary around the margin of the leak stopper. Nevertheless, other designs of electromagnets may be made use of.

Reference will hereinafter be made to the accompanying drawings, which show some examples of leak stoppers made according to my present invention.

Figure 1:
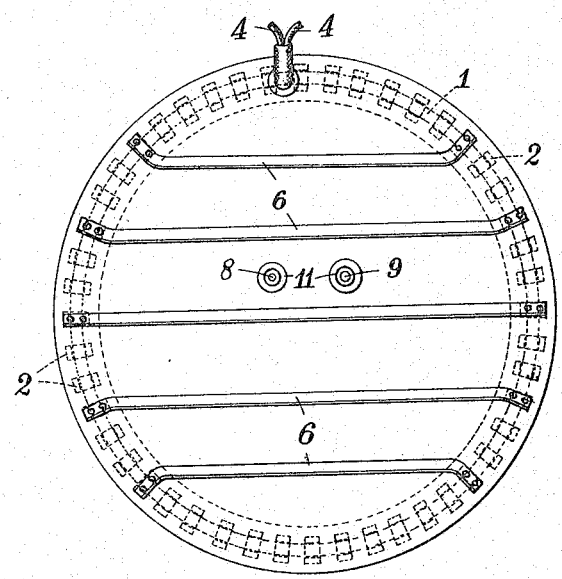
Figure 2:
Figure 3:
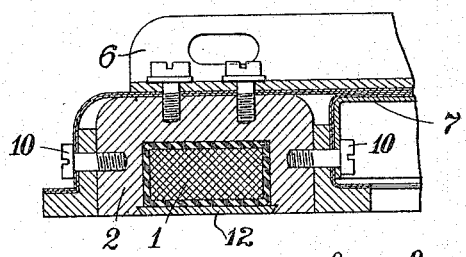
Figure 4:
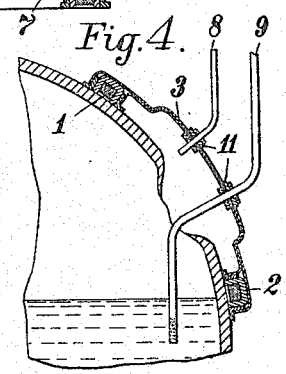
Figure 5:
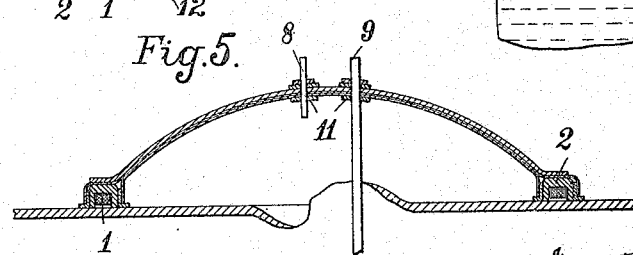

Figure 1 is a plan of such a leak stopper viewed from the outside, and Fig. 2 a cross section of the same. Fig. 3 is a cross section upon a larger scale through the edge containing the magnets and winding, and Figs. 4 and 5 are sectional views showing two different shapes of such a leak stopper in position upon a curved and a flat surface respectively.

In the form of magnet illustrated, the insulated winding 1 traverses the arms of a series of magnets 2, spaced along it throughout the length of the edge of the leak stopper 3, the winding terminating in two leads 4 or in terminals, plugs or such like fittings. Ribs 6 or plates or bars of any useful kind are affixed to the stopper, supporting it against pressure upon either side, but permitting slight bending. Waterproof material 7 may be fastened to the magnets by bolts 10 or otherwise to stop leakage on the inside as well as on the outside, as the water pressure can be from within. Pressure tubes 8 and discharge tubes 9 may be fitted to the stopper, passing through glands such as 11, when it is desired to expel water through the sealed aperture. The winding 1 may be retained in the trough formed by the magnets 2 by a brass cover plate 12.

I do not restrict myself to the details as shown or described herein, since many modifications can be made therein without departing from the essential features of my said invention.

I claim—

1. A leak stopper or collision mat comprising a piece of pliable material, an insulated electric winding near the edge of the mat, together with a number of horseshoe or slotted magnets arranged saddlewise over the said winding.

2. A leak stopper or collision mat comprising in combination a pliable body of sufficient size or area to overlap the edges of the aperture requiring to be sealed, a ring or circuit of magnetic pole pieces of horseshoe formation fastened independently at or near to the edge of said pliable body, and a winding or windings of insulated wire located between the limbs of the horseshoes and being thus common to the ring or circuit without being wound around the limbs individually.

EDWARD CECIL VILLIERS.

Witnesses:
ARTHUR H. STANLEY,
JOHN P. BLACK.

Copies of this patent may be obtained for five cents each, by addressing the "Commissioner of Patents, Washington, D. C."